US006561223B2

(12) United States Patent
Boecking

(10) Patent No.: US 6,561,223 B2
(45) Date of Patent: May 13, 2003

(54) SUBDIVIDED CONTROL VALVE BODY FOR INJECTOR CONTROL VALVE

(75) Inventor: Friedrich Boecking, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/991,849

(22) Filed: Nov. 14, 2001

(65) Prior Publication Data

US 2002/0062818 A1 May 30, 2002

(30) Foreign Application Priority Data

Nov. 27, 2000 (DE) ........................................ 100 58 760

(51) Int. Cl.[7] .................................................. F16K 3/00
(52) U.S. Cl. ................................ 137/625.5; 137/315.27
(58) Field of Search ........................... 137/15.18, 15.21, 137/625.5, 315.27, 315.09

(56) References Cited

U.S. PATENT DOCUMENTS 5,383,170 A * 1/1995 Tonhauser et al. ..... 137/625.43

FOREIGN PATENT DOCUMENTS

DE 197 01 879 A1 7/1998

* cited by examiner

*Primary Examiner*—Thomas N. Moulis
(74) *Attorney, Agent, or Firm*—Michael J. Striker

(57) ABSTRACT

An injector for injecting fuel under high pressure into a combustion chamber of an internal combustion engine has an injector housing, a control valve body which is movably received in the injector housing, an actuating unit which activates the control valve body, a restoring element associated with an end side of the control valve body, the control valve body has parts which are held against one another, and a connecting element which holds the parts of the control valve body against one another.

9 Claims, 2 Drawing Sheets

SUBDIVIDED CONTROL VALVE BODY FOR INJECTOR CONTROL VALVE

BACKGROUND OF THE INVENTION

The present invention relates to a subdivided control valve body for injector control valve.

In fuel injection systems for injection of fuel under pressure into the combustion chambers of direct injection internal combustion engines, an injection system with a high pressure collecting chamber (common rail) is utilized. It loads the injector provided for the injection with fuel under high pressure, and its pressure level remains substantially constant. In the injectors, the injection start as well as the fuel quantity injected in the combustion chamber is adjustable. The injector is electrically controlled and mounted on a cylinder head of an internal combustion engine in a space-economical manner.

German patent document DE 197 01 879 A1 discloses a fuel injection device for internal combustion engines. The disclosed fuel injection device for internal combustion engines includes a common high pressure collecting chamber which is fillable from a high pressure pump with fuel (common rail). It is connected through injection lines with injection valves which extend into the combustion chamber of the internal combustion engine to be supplied with fuel. Its opening and closing movements are controlled each by an electrically controlled control valve, wherein the control valve is formed as a 3/2-way valve. It is connected with an injection line or a release line by a high pressure passage which opens to an injection opening of the injection valve. A hydraulic working chamber which is fillable with high pressure fuel is provided on the control member of the control valve. It is controllable for adjusting the adjustment position of the control member of the control valve in a release passage.

The control member used in the 3/2-way control valve in accordance with this solution is formed with a plurality of diameter steps. On the one hand it is therefore difficult to obtain an undisturbed force equalization of the control member, and on the other hand the manufacturing costs are negatively influenced, since several operation steps have to be made on the control valve workpiece during its manufacture.

SUMMARY OF THE INVENTION

Accordingly, it is an object of the present invention to provide a valve body for an injector control valve, which avoids the disadvantages of the prior art.

In keeping with these objects and with others which will become apparent hereinafter, one feature of present invention resides, briefly stated, in a combustion chamber of an internal combustion engine, comprising an injector housing; a control valve body which is movably received in said injector housing; an actuating unit which activates said control valve body; a restoring element associated with an end side of said control valve body, said control valve body having parts which are held against one another; and a connecting element which holds said parts of said control valve body against one another.

When the control valve is designed in accordance with the present invention, it is easy to manufacture, and with the use of the modular principle and identical parts it can be designed so that a control body can be assembled with two identical parts. The both halves of the inventive control valve body can be held at the end surfaces by clamping elements which engage in the planar position the surfaces which abut against one another.

In accordance with another feature of the present invention which is especially favorable for simple manufacture, the clamping element can be centered on a pin of one half of the inventive control body and fixed. On the other half of the control body the clamping element engages over the end surface and is provided with a radial play with respect to the pin formed on the end surface of this half. With this solution it is guaranteed that the control part halves are not separated in the axial direction on the one hand, and it is possible to radially orient one half of the control body with respect to the other half of the control body in the openings of the control valve housing. In this way manufacturing tolerances can be compensated in an advantageous manner.

In accordance with another advantageous feature of the present invention, the clamping element which holds together the symmetrically constructed halves of the control valve body is accommodated in the region of the control valve housing which is closed from the valve chamber of the control valve. One half of the inventive control body is received in one housing half, while the other half of the control valve body is located in the other housing half of a two-part injector housing. Thereby on the one hand the housing can be separated during mounting in a simple manner, and on another hand the required housing tolerances can be produced in a favorable manner for the manufacture, since the opening—and position tolerances can be compensated by the radial gap between the halves of the control valve.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
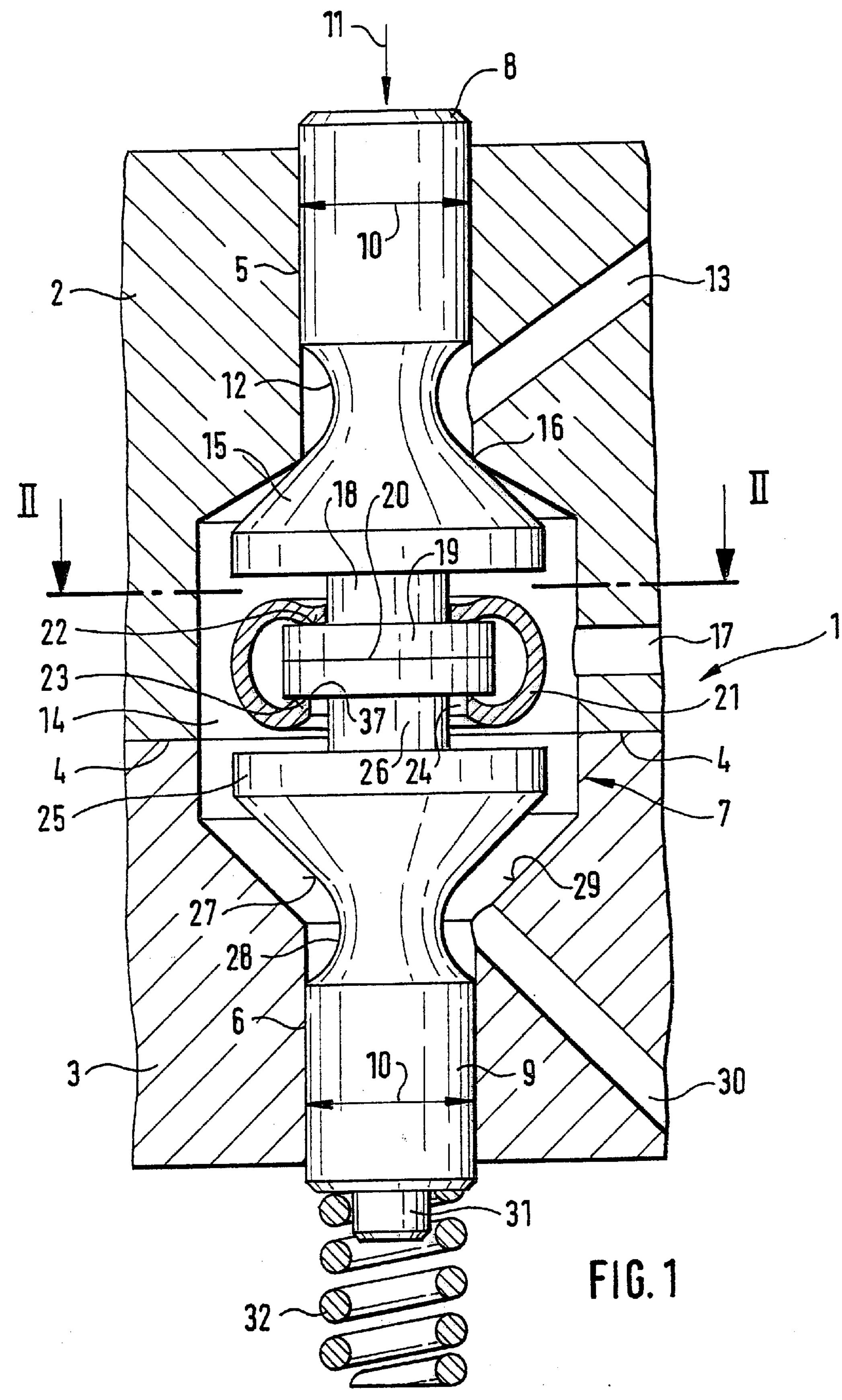
FIG. 1 is a view showing a longitudinal section of a control body in accordance with the present invention.

A control valve in accordance with the present invention is illustrated in FIG. 1 in a longitudinal section. In the embodiment shown in FIG. 1 a housing 1 which receives a control valve body 7 is composed of two parts. The upper part 2 of the housing and the lower part 3 of the housing abut against one another over a common separation joint 4. The separation joint extends preferably in the region of a valve chamber 14 which surrounds the control valve 7 in the housing 1 of the injector.

The upper half 8 of the control valve body 7 is formed in an upper opening region 5 inside the upper housing half 2 in a diameter 10. The guiding region of the upper half 8 of the control valve body 7 formed in the diameter 10, with which it is guided in the upper opening portion 5, is followed by a constriction 12. Inside the constriction 12, the upper part 2 of the housing opens into an outlet opening 13. A seat cone 15 is connected with the constriction 12 of the upper part 8 of the control body 7 and cooperates with a seat surface 16 which is formed in the housing. The seat cone 15 transits into a surface which surrounds it in a ring-shaped manner. Under the surface which follows the seat cone 15, the upper half 8 of the control body 7 has a pin 18. An end surface 19 of the upper part 8 of the control valve body 7 is connected with the pin 18.

A lower half 9 of the control body 7 is received movably in the lower part of the housing, symmetrically to the upper part 8 of the control valve body 7. The lower part 9 of the control valve body 7 is identical to the upper part 8 of the control valve body 7, however, they are arranged mirror-symmetrically with respect to a common abutment surface 20. This means that the lower half 9 of the control valve body 7 also has an abutment surface formed on an end surface, on which a pin region 26 is connected. A ring-shaped projection 28 is connected with the pin region 26 of the lower half 9 of the control valve body 7 and transits into an inner seat cone 27 on the lower half 9 of the control valve body 7.

A constriction 28 is connected with the seat cone 27, which in turn transits into a guiding portion. The latter has a control valve diameter 10 which is identical to the diameter of the upper half 8 of the control valve body 8. A pin-shaped projection 31 is formed on the lower side of the lower half 9 of the control valve body 7. It serves as a guide for a restoring element formed as a spiral spring 32. The restoring element 32 formed as a spiral spring is supported on the housing, in particular on a not shown wall. Opposite to the constriction 28 of the lower half 9 of the control valve body, an inlet 30 opens into the lower part 3 of the housing. Fuel under high pressure from the high pressure collecting chamber enters through the inlet 30 in the constriction 28 of the lower half 9 of the control valve body 7 and the wall of the lower part 3 of the housing.

A connecting element 21 formed as a spring clip is provided in the region of the contact surface 20 and the opposite, abutting end sides of the upper half 8 and the lower half 9 of the control valve body 7. The connecting element 21 which is formed as a spring clip of a metallic material form-lockingly lies on the pin 18 on the upper supporting surface 22. The connecting element 21 is fixed and centered on the pin 18. At the side of the lower half 9 of the control valve body 7 which is opposite to the abutment surface 20, the connecting element 21 lies in the ring-shaped abutment 37 which engages with the end surface of the lower half 9 of the control valve body 7. The abutment of the connecting element 21 on the rear side of the end surface of the lower half 8 of the control valve body 7 is dimensioned so that, between the connecting element 21 and a pin 26 of the lower half 9 of the control valve body 7, a radial gap 24 is provided.

During a vertical stroke released by activation of the actuation element 11, an adjusted separation of the upper half 8 and the lower half 9 of the control valve body 7 at the abutment surface 20 is excluded by the connecting element 21 which engages over the end surfaces of the upper half 8 of the control valve member 7 and the lower half 9 contacting one another on the abutment surface 20. However, the connecting element 21, because of the radial gap 24 between the pin 26 and the abutment surface formed ring-shaped at the rear side of the end surface of the lower half 9 of the control valve body 7, allows a radial movement of the lower half 9 of the control valve body 7 relative to the upper half of the control valve body 7.

The housing 1, in which the upper half 8 as well as the lower half 9 of the assembled control valve body 7 are guided, can be formed as a two-part housing including an upper housing part 2 and a lower housing part 3.

When the housing 1, in which the upper half 8 and the lower half 9 of the assembled control valve body 7 are guided, is formed as a two-part housing including the upper part 2 and the lower part 3, then favorable manufacturing tolerances with respect to the opening tolerances and the position tolerances of the opening portions 5 and 6 in the upper part 2 and the lower part 3 of the housing can be selected. This drastically reduces the manufacturing costs of the control valve body 7 in accordance with the present invention on the one hand, since now a compensation of tolerances is possible by a radial movement of the half 8, 9 of the control valve body 7 relative to the other halves 8, 9 of the control valve body 7. Thereby on the one hand the hubs 8 and 9 of the control valve body 7 can be produced in a cost favorable manner, and on the other side the opening portions 5, 6 in the upper housing part 2 and in the lower housing part 3 can be also produced in a cost favorable manner.

A further not insignificant advantage of the inventive solution is that, with the use of identical parts a mirror-symmetrical construction of the assembled control valve body 7 can be provided. Furthermore, the inventive solution provides the advantage in that, the assembled control valve body 7 composed of the upper half and the lower half 9 is completely force-compensated. The reason is that both the seat cones 15 and 27 as well as the end surfaces 16, 29 in the upper part 2 and in the lower part 3 of the housing are identical. Furthermore, the guiding regions 10 with which the upper half 8 and the lower part 9 of the assembled control valve 7 are guided correspondingly in the upper part 2 and the lower part 3 of the housing are formed with an identical diameter 10.

Figure 2:
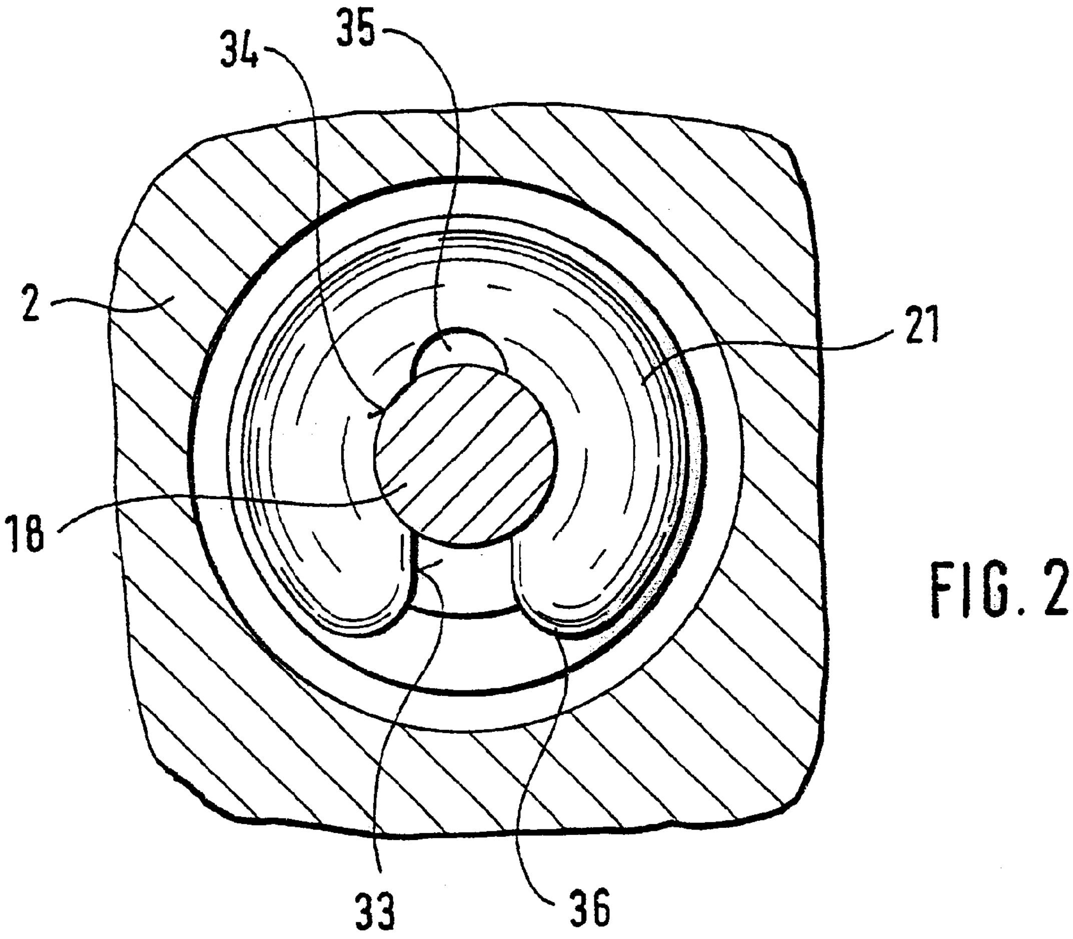
FIG. 2 is a view showing a cross-section through a pin of an upper part of the control piston which is surrounded by a clamping element.

FIG. 2 illustrates the cross-section through the pins of the upper half of the control valve body surrounded by the connecting element. The cross-section of FIG. 2 is identified as II/II in FIG. 1 and extends through the pin 18 which extends between a ring-shaped surface of the upper half 8 of the control valve body 7 and its end surface, which in turn is surrounded by the connecting element 21. From FIG. 2 it can be seen that the spring element 20 is held in abutment to the pin 18 of the upper half 8 of the control valve body 7. Due to the abutment of the connecting element 21 against the pin 18 of the upper half 8 of the control valve body 7, a substantial ring-shaped abutment surface 34 between the connecting element 21 and the outer side of the pin 18 is produced. The ring-shaped extending abutment surface region 34 is interrupted by a gap 35 as well as by an opening 33.

The spring element 21 which is composed preferably of a metallic material such as for example high grade steel, is provided with a rounding 36 and surrounds the pin 18 of the upper half 8 of the control valve body 7 in the abutment surface 34 and the pin 26 of the lower half 9 of the control valve body 7 in the ring-shaped abutment 37, on its upper end surface as well as with a radial gap 24 with respect to the pin 26 of the lower half 9. In this way differences in the opening portions 5 and 6 of the upper part 2 and the lower part 3 of the housing due to the manufacturing tolerances can be compensated, and simultaneously a separation of the upper half 8 and the lower half 9 of the control valve body 7 during radial strokes produced during a regulation of the control element 1 can be prevented.

It will be understood that each of the elements described above, or two or more together, may also find a useful application in other types of constructions differing from the types described above.

While the invention has been illustrated and described as embodied in subdivided control valve body for injector control valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An injector for injecting fuel under high pressure into a combustion chamber of an internal combustion engine, comprising an injector housing; a control valve body which is movably received in said injector housing; an actuating unit which activates said control valve body; a restoring element associated with an end side of said control valve body, said control valve body having parts which are held against one another; and a connecting element which holds said parts of said control valve body against one another.

2. An injector as defined in claim 1, wherein said parts have abutment surfaces which are held in abutment against one another, said connecting element surrounds said abutment surfaces in a springy fashion.

3. An injector as defined in claim 1, wherein said connecting element is fixed on one of said parts on an upper abutment surface.

4. An injector as defined in claim 3, wherein said upper abutment surface is formed by a pin of an upper one of said parts of said control valve body.

5. An injector as defined in claim 1, wherein said connecting element is arranged on said parts which abut against one another with a radial gap relative to an abutment surface.

6. An injector as defined in claim 5, wherein said abutment surface of a pin is formed at a lower one of said parts of said control valve body.

7. An injector as defined in claim 5, wherein said connecting element is received with said radial gap relative to a lower abutment surface and abuts on an end surface of said lower part of said control valve body so as to form a ring-shaped clamping surface.

8. An injector as defined in claim 1, wherein said connecting element is formed as a spring clamp.

9. An injector as defined in claim 1, wherein said parts of said control valve body are identical and held mirror-symmetrically relative to a contact surface formed by an abutment of said parts against one another.

* * * * *